United States Patent [19]
Goodridge

[11] 3,832,604

[45] Aug. 27, 1974

[54] ELECTRICAL PROTECTIVE PANEL ASSEMBLY

[75] Inventor: Lawrence Carvin Goodridge, Bristol, Conn.

[73] Assignee: General Electric Company, New York, N.Y.

[22] Filed: Apr. 9, 1973

[21] Appl. No.: 349,041

[52] U.S. Cl. ............ 317/120, 317/118, 339/198 N
[51] Int. Cl. .......................................... H02b 1/04
[58] Field of Search .... 317/107, 108, 110, 118–120, 317/122; 174/51, 59; 339/14 R, 14 L, 198 N, 198 G, 272 R

[56] References Cited
UNITED STATES PATENTS

| | | | |
|---|---|---|---|
| 2,897,410 | 7/1959 | Hammerly | 339/198 N |
| 2,907,977 | 10/1959 | Daley | 317/118 |
| 3,171,708 | 3/1965 | Salomone | 339/198 N |
| 3,335,330 | 8/1967 | Hall | 317/119 |
| 3,348,103 | 10/1967 | Berry | 317/120 |
| 3,618,804 | 11/1971 | Krause | 317/120 |

Primary Examiner—Robert K. Schaefer
Assistant Examiner—Gerald P. Tolin
Attorney, Agent, or Firm—Robert A. Cahill; Philip L. Schlamp; Frank L. Neuhauser

[57] ABSTRACT

An electrical protective panel assembly comprising a conductive rectangular enclosure containing a conductive rectangular frame for mounting a plurality of electrical protective devices in the enclosure. Electrical ground contact assemblies are located at the corner regions of the panel assembly and each includes means for readily electrically connecting thereto the ground wires of equipment to be protected by the adjacently located protective devices. Alternatively, one or more such contact assemblies are mounted on the inner wall of the enclosure, on frame members at the corner sections of the frame structures or on lateral members of the frame structure. The contact assemblies can be mounted in position during original manufacture of the panel assembly or in the field. The ground contact assemblies each includes a conductive bracket having a terminal strap conductively and removably mounted therein. The strap carries one or more terminal strips with means for individually connecting a plurality of ground wires to the terminal strap. The terminal strips are each selectively and independently positionable in predeterminedly oriented positions to facilitate ground wire connections therein. Preferably the ground contact assemblies are removably mounted on frame members at the corner sections of the frame structure adjacent the point of entry of the wires into the enclosure and a plurality of these assemblies can be mounted in side-by-side or back-to-back relation on each corner or side of the frame structure. In panel assemblies in which the wiring enters the enclosure elsewhere than in the corner regions thereof, the contact assemblies are mounted on an internal support structure immediately adjacent the point of entry of the wiring.

8 Claims, 5 Drawing Figures

ELECTRICAL PROTECTIVE PANEL ASSEMBLY

BACKGROUND AND SUMMARY OF THE INVENTION

Electrical panelboards and other electrical protective panel assemblies generally comprise a rectangular metal enclosure or box with a protective cover and a rectangular frame suitably mounted on the back wall of the box and in spaced relation to the lateral walls thereof. The frame is adapted for suitably supporting a plurality of electrical protective devices, such as molded case circuit breakers, in the assembly. The protective devices are generally mounted side-by-side in one or more parallel rows and are connected to a common neutral bus in the enclosure behind the frame. The power feeder lines to the devices generally enter the enclosure through conduits connected to the upper and lower sides, or ends, of the enclosure and the branch feeder lines, or wiring, connecting the devices to the electrical equipment to be protected thereby usually enter the enclosures through conduits connected to the upper and lower sides, or ends, of the enclosures at or adjacent the corner regions thereof. The spacing between the frame and enclosure side walls serves as wiring gutters and usually the branch lines run through these gutters to the respective protective devices and a single common copper or aluminium grounding terminal bar.

Heretofore, when equipment grounding terminals have been required on panelboards all the required grounding terminals were assembled on a single common grounding terminal bar either welded to the box in the wiring gutter or assembled on the panelboard frame near the neutral bus. This common grounding bar was necessarily large owing to the fact that it had to carry all the grounding terminals needed, and specifically one for each protected circuit. Also, often it was located centrally in the frame to be near the neutral bus. Accordingly, in designing such panel assemblies considerable space had to be allocated to the grounding bar and, in order to accommodate this arrangement, the box, frame and covers all had to be originally constructed larger than if no such bar were required. Additionally, considerable total lengths of ground wire were needed to reach the ground bar from the corner regions of the box where the branch lines entered. In cases where a protective device was located adjacent the corner regions, the energized line of the respective protected circuit could be relatively short but a substantially longer length of wire was needed to connect to the central common ground bar. This additional wire and the additional material required to provide the larger box, frame, covers and common grounding bar added considerably to the cost of the assembly and its usage. Also, it made the assembly less universally useful because it could not be used where mounting space was at such a premium as not to be able to accommodate the larger panel assembly.

Furthermore, not all uses of panelboards require ground connections in the panel assembly; and some panelboard assemblies are purchased without ground bars and grounding means are subsequently field installed only where needed. If one were to try to anticipate all possible situations where a common ground bar might possibly be required after installation, it would be necessary to manufacture the boxes, frames and covers all large enough to accommodate a common ground bar of the above-discussed type when and if it should subsequently be required. This would add considerably to the cost and space requirements. Alternatively, one could manufacture different assembly sizes, which is not an attractive approach from the inventory and marketing approaches or from the users' standpoint inasmuch as a smaller box may not be adequate if subsequently it is desired to field-install equipment grounding terminals.

The present invention obviates these various problems and conserves material and reduces costs by locating discrete relatively simply constructed and inexpensive ground connector assemblies in regions of the panel assembly immediately adjacent the regions or points or entry of the branch feeders. These comprise individual terminal assemblies which can be readily and selectively mounted in the wiring gutters on the back or side walls or the enclosure or on the panelboard frame at the corner or center sections thereof. Such terminal assemblies can be fastened in place during original manufacture of the panelboard assembly or they can comprise grounding connector kits adapted for easy field installation and use. Each connector assembly comprises a conductive bracket removably supporting a contact strap which, in turn, carries one or more terminal strips adapted for individually securing a plurality of ground wires from the branch feeders to the terminal strap. The terminal strips cooperate with the terminal strap in a way such that each strip is selectively and independently positionable on the strap to best orient it for receiving the ground wires to be connected thereby to the strap. Additionally, the connector assemblies can be mounted in various positions including back-to-back relation on opposite sides of a frame member, in which latter arrangement the selective orientation capability of the terminal strip is particularly advantageous.

OBJECTS OF THE INVENTION

A general object of the invention is to obviate the need for providing a common ground bar in an electrical protective panel assembly where ground terminals are required.

Another object of the invention is to avoid the additional costs, efforts and space requirements associated with the manufacture and use of electric protective panel assemblies either originally provided with common ground bars or adapted for having such grounding means field installed.

Another object of the invention is to provide an electrical protective panel assembly which can be of reduced size and universally adaptable for incorporation therein of ground contact means which can be either factory-installed or field-installed.

Another object of the invention is to provide an electrical protective panel assembly including an improved grounding contact arrangement effective for minimizing the grounding wire required to effectively wire the circuits to be protected by the protective devices in the assembly.

Still another object of the invention is to provide a versatile ground contact assembly adaptable for ready installation in the factory or in the field and for facilitating wiring operations in the field.

3

DETAILED DESCRIPTION OF PREFERRED EMBODIMENTS

Figure 1:
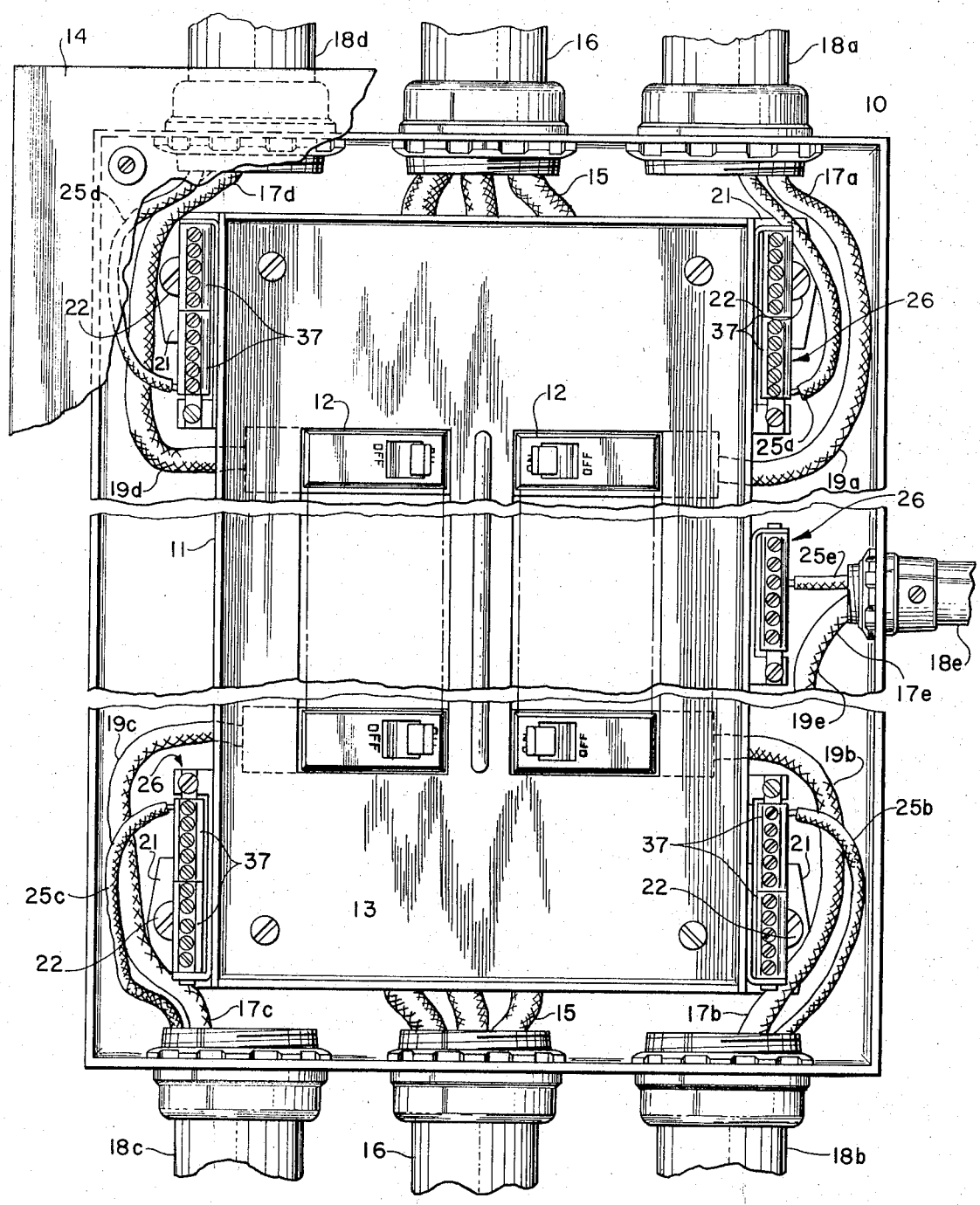
FIG. 1 is a front elevational view of an electrical protective panel assembly with the protective cover broken away to illustrate various embodiments of the invention generally.

The invention is shown generally in FIG. 1 as embodied in an electrical protective panel assembly including a rectangular box-like metallic enclosure 10 having suitably mounted therein a rectangular metal frame structure 11 adapted for supporting a plurality of electrical protective devices 12 such as molded case circuit protectors. A so-called "dead front shield" 13 fitted and suitably secured on the front of the frame includes enlarged apertures through which access is afforded to the setting controls of the breakers 12, but otherwise the shield covers the energized conductors, including a main bus, located behind the shield and not shown. The protective devices 12 are suitably retained in the frame by means not shown and can be any required number depending on the number of equipment circuits to be protected thereby. Also, they can be arranged in multiple rows as illustrated. Additionally, an outer cover designated 14 and shown fragmentarily in the upper left hand region of FIG. 1 is adapted for normally covering the enclosure 10 to protect it against unintended or unauthorized manual operation of the breakers.

The panel assembly is usually oriented and mounted vertically on a wall in the position shown in FIG. 1 and power feeder lines generally designated 15 enter the enclosure 10 through conduits 16 suitably coupled to apertures located centrally in the top and bottom sides of the enclosure. The lines 15 are appropriately connected to the main busses of the circuit breakers.

Also entering the enclosure 10 are branch feeder lines generally designated 17a–17d. These lines are connected in the circuits of the equipment to be protected by the circuit breakers 12 and are brought into the enclosure 10 through four conduits 18a–18d each suitably coupled to an aperture in the upper and lower side or end walls of the enclosure at or closely adjacent a corner section of the enclosure. In an alternative embodiment, which is illustrated in the center section of FIG. 1 and which will be discussed in more detail hereinafter, branch or feeder lines 17e are brought into the enclosure through conduits 18e suitably coupled to apertures in the lateral side walls of the enclosure.

The box 10 and the frame structure 11 are relatively dimensioned to provide lateral spacing between the frame sides and the enclosure side walls. This spacing in the box around the frame serves as wiring gutters and, as seen in FIG. 1, the branch feeder lines enter such gutters and extend therein to their respective devices. For example, line 19a extends downwardly into the right side gutter and is connected to the right hand uppermost breaker in the assembly, line 19b extends upwardly in the right side gutter and is connected to the lowermost right hand breaker, line 19c extends downwardly in the left side gutter and connects to the uppermost left hand breaker, and line 19d extends upwardly in the left side gutter and connects to the lowermost left hand breaker. Similar other branch feeders (not shown) enter the enclosure through the conduits 18, extend toward respective other breakers (not shown) through the wiring gutters and are suitably connected to such other breakers. Only four breakers and their respective feeder lines are shown for ease of illustration and explanation; however, it is to be understood that the assembly can include any required number thereof.

Figure 2:
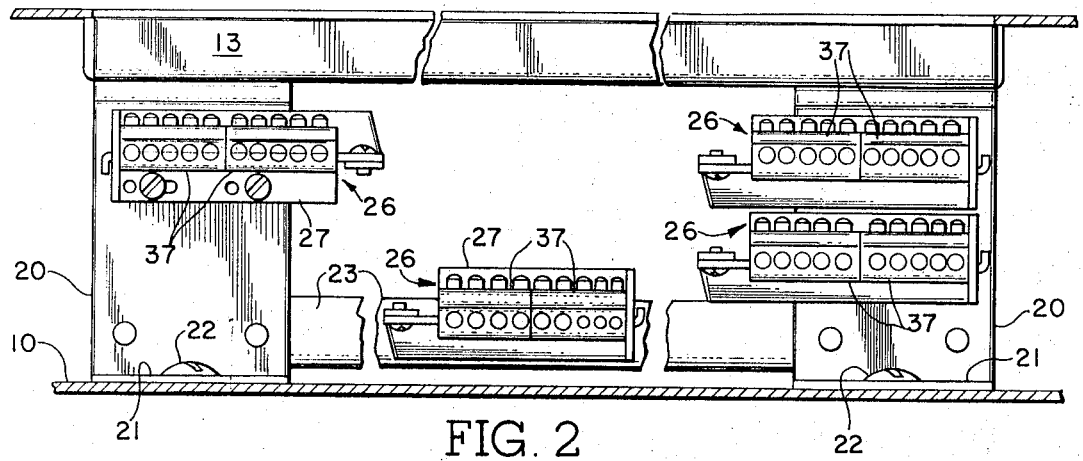
FIG. 2 is a fragmentary side elevational view showing two corner sections and a center section of the panelboard frome and illustrating certain alternative embodiments of the invention.
Figure 3:
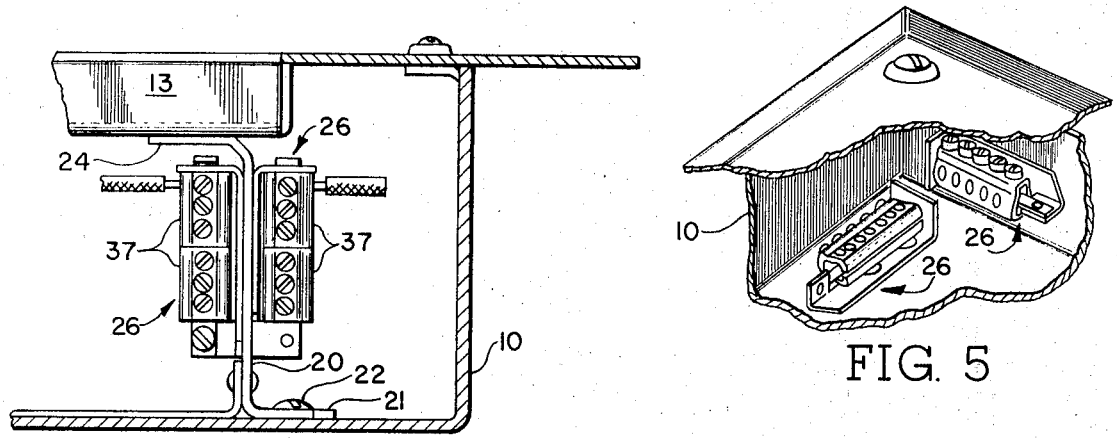
FIG. 3 is a fragmentary, partially sectionalized view of a corner section of the panelboard frame and illustrating another embodiment of the invention.

The frame structure 11 in which the breakers are supported will be better understood with reference to FIGS. 1–3, wherein it is seen that the frame comprises four upstanding metal brackets 20 each of which is located at a corner section of the frame and has a bent off foot section 21 conductively secured, as by a screw 22, to the back wall of the enclosure. Secured, as by riveting or bolting, between the upper and lower brackets 20 on each side of the assembly is a metal side rail 23. Each of the brackets 20 also includes a bent section 24 of a type shown in FIG. 3. The four sections 24 are coplanar and each serves as a support for a respective corner of the shield 13.

The frame structure 11 is suitably grounded; and provided for making grounding connections between the frame and ground wires 25a–25d from the branch lines of the circuits of the equipment to be protected are a plurality of discrete electrical ground contact assemblies 26 conductively mounted on the frame bracket 20. The ground contact assemblies are each constructed preferably as shown in FIG. 4 and one can be mounted on each of the frame brackets 20 in the manner shown in FIG. 1 and at the left hand side of FIG. 2, or a plurality of the contact assemblies can be mounted on one or more of the frame brackets in the manner shown at the right hand side of FIG. 2, or, a pair of the assemblies can be mounted in back-to-back relation on opposite surfaces of a frame bracket 20 in the manner shown in FIG. 3.

Figure 4:
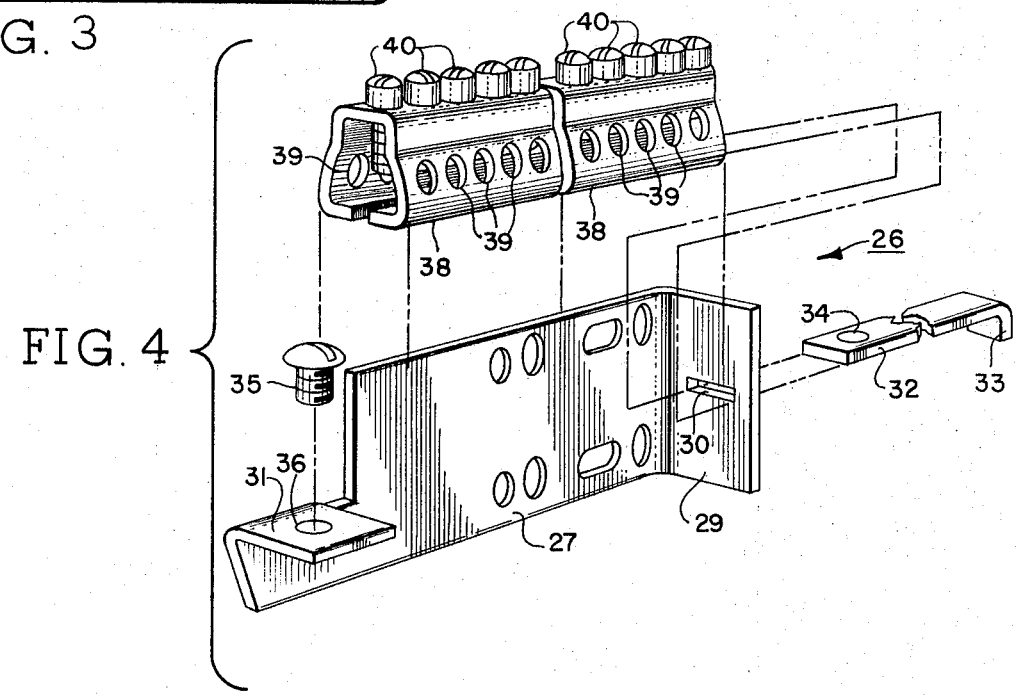
FIG. 4 is an exploded perspective view illustrating the parts and construction of a ground contact assembly constructed according to a preferred embodiment thereof.

More specifically, and as best seen in FIG. 4, each ground contact assembly 26 comprises a metal support bracket 27 having a generally flat rectangular base section 28 suitably apertured to receive screws or other fastening means for mounting it on a frame bracket or elsewhere in the panel assembly in accordance with the present invention. The bracket 27 is formed with one end 29 bent to extend perpendicular relative to the base section and that end is provided with a rectangular aperture 30. The other end of the bracket 27 is formed with a bent off section 31 which extends in a plane perpendicular to both the base section and the opposite end 29. Removably supported in the bracket 27 between the end sections 29 and 31 is a flat elongated contact strap 32. The strap 32 is slidably positioned in the slot 30 and includes a bent section or ear 33 to retain the respective end of the strap in the bracket when the connector is assembled in the manner shown in FIGS. 1–3. The opposite end of the strap is apertured at 34 for receiving a screw 35 which is adapted for threadedly engaging a tapped aperture 36 in the bracket ear 31. This arrangement is provided for supporting the contact strap in coextensive spaced parallel relation to the bracket base 28 and in electrically conductive relation with the bracket.

Removably carried on the strap 32 are one or more contact strips 37 which, as best seen in FIG. 4, comprise generally tubular metal members 38 which are each slidably and removably positioned on the strap, have a plurality of opposed pairs of ground wire receiving apertures 39, and carry a plurality of downwardly extending contact screws 40 for holding wires inserted in the apertures 39 in tight electrically effective contact with the terminal strap 32 positioned in the members 38. The holes 39 can, if desired, be of various diameters to accommodate ground wires of different gauges. The lower sides of the members 38, as viewed in FIG. 4, have a somewhat flattened cross-sectional configuration. This facilitates the positioning of the terminal strap therein when the connector is assembled. Also, it serves to orient the connector relative to the strap so that in normal usage the screws 40 extend perpendicular to the contact strap and the cooperation of the screws bearing on the strap through the ground wires connected thereto serves to hold the connector firmly in place. Also, in this arrangement the cooperation of the strips 37 and the contact strap 32 are such that one, or both of the strips 37 can be selectively inverted from the positions thereof shown in FIG. 4. This enables selective predetermined orientation of the strips 37 which enables one, for example, to arrange a pair of the assemblies 26 in back-to-back relation, as shown in FIG. 3, while still having all strips 37 positioned with the screw heads oriented outwardly for easy access. When the back-to-back arrangement is employed the various apertures illustrated in the base section 28 of the support bracket 27 serve to receive and to accommodate the ends of the respective fastening screws.

If desired, the slot 30 in the bracket section 29 can extend parallel to the base section 28 as can the end section 31. This would orient the contact strap 90° from the position shown in FIG. 4 and thus would serve to orient the contact strips 30 so that the screws 40 would face outwardly or extend perpendicular to the plane of the bracket base 28. This arrangement can be advantageous in some applications depending upon where and how one wishes to mount the support bracket in the panel assembly.

Thus, as seen in FIG. 1 a contact assembly 26 can be mounted vertically on the sides of the frame 11 at each corner section thereof. More specifically, each such assembly can be screwed, or otherwise fastened, to the respective frame corner bracket 20 in the manner shown at the left side of FIG. 2. Also, each of the contact assemblies can include a pair of terminal strips 37, or a greater or lesser number of such strips, positioned on the terminal strap 32, depending upon ground terminal capacity required.

As seen at the right hand side of FIG. 2, a plurality of contact assemblies can be fastened to each frame bracket 20 where substantial ground contact capacity is required. Also, and as seen in FIG. 3, a pair of contact assemblies can be mounted on a frame bracket in back-to-back relation on opposite surfaces of the frame bracket. When this arrangement is employed the capability of reversing the strips on one of the terminal straps so that all contact screws 40 face outwardly is of particular advantage. Also, it obviates the need for making differently oriented assemblies, or in other words, makes the assembly shown in detail in FIG. 4 more universally applicable for mounting in various desired positions.

As noted above, and as seen in the center sections of FIGS. 1 and 2, the contact assemblies 26 can be mounted on the side members 23 of the frame structure. This enables the assemblies to be mounted immediately adjacent the point of entry of the branch feeder lines where they are brought into the enclosure through an aperture in a lateral side wall of the enclosure. More specifically, the feeder lines 17e are brought into the enclosure through a conduit 18e coupled to a side wall aperture; and in the wiring gutter immediately adjacent the point of entry, the ground wires 25e are connected to a ground contact assembly 26 mounted on a frame side member 23. This arrangement also serves to provide a short ground wire distance from the wiring point of entry to the grounding connector and can be duplicated, if desired, on the opposite side of the panel assembly. Lateral entries of this type are particularly advantageous when the panel assembly is vertically long and lateral access is more convenient or the only access available. Also, while a single connector 26 is shown on the frame side member, a plurality of such connectors could be suitably mounted if greater capacity is needed.

Figure 5:
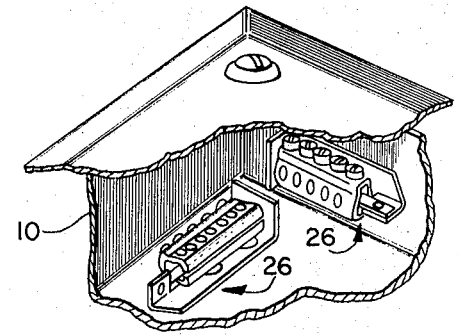
FIG. 5 is a fragmentary perspective illustration of still another embodiment of the invention.

As seen in FIG. 5, the contact assemblies 26 can also be mounted in any desired position on the back or side walls of the enclosure 10 in or adjacent the corner regions thereof, and it will be seen that in this arrangement, as in those above-described, the contact assemblies can be mounted either on the frame or in the box in the indicated positions either at the factory during original assembly or subsequently as a field installation. The contact assemblies are easy to assembly and install and are sufficiently small to fit readily in the already available wiring gutter space of the panel assembly. This obviates the need for providing enlarged panel assemblies to accommodate relatively large common ground bars whether or not they may be required.

Also, and very importantly, the location of the contact assemblies 26 in the corner regions of the panel assembly, and specifically on the corner sections of the frame 11 or in the corner sections of the enclosure 10, shortens substantially the ground wire needed to make connections thereto from the branch lines entering the enclosure at the corner regions of the enclosure. More specifically, and as best seen in FIG. 1, all the ground wires 25a–25d and other ground wires entering through the conduits 18a–18d for grounding inside the enclosure are substantially shorter than would be needed if a single common ground bar were provided in the panel assembly. Such is the case also where the contact assemblies 26 are mounted on the side members of the frame immediately adjacent the point of entry of the feeder lines 17e into the side wiring gutters through the laterally located conduits 18e. This results in considerable savings in wire.

Various modifications may be made in the panel and contact assemblies illustrated without departing from the invention, and other modifications will occur to persons familiar with and skilled in the art when exposed to the present invention. It is therefore intended by the appended claims, to cover all modifications as

What I claim as new and desire to secure by Letters Patent of the United States is:

1. An electrical ground contact assembly comprising:
   a. an electrically conductive bracket having,
      1. an elongated flat base section,
      2. a first end section extending perpendicular to said base section and apertured for receiving an end of an electrical terminal strap, and
      3. an oppositely disposed second end section bent out of the plane of said base section for having the other end of said terminal strap secured thereto;
   b. an elongated flat terminal strap extending in coextensive spaced relation to said base section of said bracket and having,
      1. one end positioned and retained in said aperture in said first end section, and
      2. the opposite end removably secured to said second end section of said bracket; and
   c. electrical terminal means carried on said terminal strap and having means for individually electrically connecting a plurality of wire ends to said terminal strap.

2. An electrical ground contact assembly according to claim 1, wherein said one end of said terminal strap is bent off the strap for effectively retaining that end of said strap in said bracket.

3. An electrical ground contact assembly according to claim 1, wherein said second end section of said bracket extends in a plane perpendicular to both said base section and said one end section of said bracket for having said opposite end of said terminal strap conductively and removably secured thereto.

4. An electrical ground contact assembly according to claim 1, wherein said electrical terminal means comprises a plurality of individual terminal strips each selectively positionable on said terminal strap in any one of a plurality of predeterminedly oriented positions, and each of said strips having means for individually electrically connecting a plurality of wire ends to said terminal strap.

5. An electrical ground contact assembly comprising:

a. an electrically conductive support bracket having,
      1. a generally rectangular base section apertured for receiving mounting screws,
      2. a first end section bent perpendicularly off said base section and having a rectangular slot therein, and
      3. a second end section bent off said base section perpendicular to both said body and first end section and having a tapped aperture for receiving a fastening screw;
   b. a flat elongated terminal strap slidably positioned in said slot in said first end section of said bracket in coextensive spaced relation to said base section of said bracket and having,
      1. a first end bent thereof for thereby removably retaining that end in said slot, and
      2. an apertured opposite end for being secured by a screw to said second end section of said bracket; and
   c. a plurality of slidably removable terminal strips retained on said terminal strap and each having,
      1. means for individually electrically connecting a plurality of wire ends to said terminal strap, and
      2. being selectively positionable in either one of two predeterminedly oriented positions.

6. An electrical protective panel assembly comprising:
   a. a rectangular box-like enclosure;
   b. a rectangular frame for supporting a plurality of electrical protective devices mounted in said enclosure; and
   c. means for providing grounding connections for equipment to be protected by said devices, comprising an electrical ground contact assembly mounted in grounded relation in at least one corner region of said panel assembly and having means for electrically connecting thereto a plurality of ground wires of equipment protected by devices mounted adjacently in said frame, said means for providing grounding connections comprises:
      1. an electrically conductive bracket attached to a support surface in said corner region of said assembly,
      2. a terminal strap conductively supported by said bracket, and
      3. electrical terminal means carried on said terminal strap and having means for individually connecting a plurality of wire ends to said terminal strap.

7. An electrical protective panel assembly comprising:
   a. a rectangular box-like enclosure;
   b. a rectangular frame for supporting a plurality of electrical protective devices mounted in said enclosure,
      1. said frame being conductive;
   c. means for providing grounding connections for equipment to be protected by said devices, comprising an electrical ground contact assembly mounted in grounded relation in at least one corner region of said panel assembly and having means for electrically connecting thereto a plurality of ground wires of equipment protected by devices mounted adjacently in said frame, said means for providing grounding connections comprises:
      1. at least one electrically conductive bracket attached to said frame at at least one corner section thereof,
      2. at least one terminal strap conductively supported by each said brackets, and
      3. at least one electrical terminal strip carried by each said terminal strap and each having means for individually electrically connecting a plurality of grounding wires to the respective terminal strap.

8. An electrical protective panel assembly comprising:
   a. a rectangular box-like enclosure;
      1. said enclosure being electrically conductive;
   b. a rectangular frame for supporting a plurality of electrical protective devices mounted in said enclosure; and
   c. means for providing grounding connections for equipment to be protected by said devices, comprising an electrical ground contact assembly mounted in grounded relation in at least one corner region of said panel assembly and having means for electrically connecting thereto a plurality of ground wires of equipment protected by devices mounted adjacently in said frame, said means for providing grounding connections comprises:

1. at least one electrically conductive bracket attached to an inner wall and in at least one corner region of the enclosure,
2. at least one terminal strap conductively supported by each said brackets, and
3. at least one electrical terminal strip carried by each of said terminal straps and each having means for individually electrically connecting a plurality of grounding wires to the respective terminal strap.

* * * * *